US012794663B2

(12) United States Patent
Boettcher et al.

(10) Patent No.: US 12,794,663 B2
(45) Date of Patent: Nov. 10, 2026

(54) COMPUTER-IMPLEMENTED METHODS FOR TRANSMITTING OR RECEIVING DATA, DEVICES FOR TRANSMITTING OR RECEIVING DATA

(71) Applicant: Robert Bosch GmbH, Stuttgart (DE)

(72) Inventors: Jens Boettcher, Vienna (AT); Christian Brinkmann, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 334 days.

(21) Appl. No.: 18/677,973

(22) Filed: May 30, 2024

(65) Prior Publication Data

US 2024/0430072 A1 Dec. 26, 2024

(30) Foreign Application Priority Data

Jun. 22, 2023 (DE) ..................... 10 2023 205 868.5

(51) Int. Cl.
*H04L 7/04* (2006.01)
*H04L 7/00* (2006.01)

(52) U.S. Cl.
CPC .............. *H04L 7/04* (2013.01); *H04L 7/0079* (2013.01)

(58) Field of Classification Search
None
See application file for complete search history.

(56) References Cited

U.S. PATENT DOCUMENTS 3,906,484 A * 9/1975 Melvin, Jr. ............. H04L 25/40 375/370
5,459,469 A * 10/1995 Schuchman .......... G01S 13/765 342/36
5,798,726 A * 8/1998 Schuchman ............. G08G 5/26 342/36
7,936,793 B2 * 5/2011 Quiroga .................. H04J 3/047 370/506
9,021,292 B2 * 4/2015 Ross ......................... H03L 7/00 713/502
2002/0021679 A1 * 2/2002 Paneth ................. H04B 7/0865 370/468
2003/0067895 A1 * 4/2003 Paneth ................. H04B 7/0865 370/344
2003/0142646 A1 * 7/2003 Paneth ................. H04B 7/0865 370/330
2005/0018636 A1 * 1/2005 Paneth ................. H04B 7/0865 370/336

(Continued)

*Primary Examiner* — Faiyazkhan Ghafoerkhan
(74) *Attorney, Agent, or Firm* — NORTON ROSE FULBRIGHT US LLP

(57) ABSTRACT

A computer-implemented method for receiving data. Data are received in a bit stream asynchronously and serially via a transmission medium, wherein the data are received in frames that include a respective portion of the data, wherein the frames include a respective synchronization bit, wherein consecutively received frames have alternating values of the synchronization bits. A start of the consecutive frames is determined depending on the values of the bits of the frames. The portions of the data from consecutive frames are compiled without the synchronization bit to form the data. A computer-implemented method for transmitting data, a device, and a computer-implemented method for transmitting the data, are also described.

12 Claims, 4 Drawing Sheets

(56) References Cited

U.S. PATENT DOCUMENTS

| | | | | |
|---|---|---|---|---|
| 2005/0025094 | A1* | 2/2005 | Paneth | H04B 7/0865 370/328 |
| 2005/0025097 | A1* | 2/2005 | Paneth | H04B 7/0865 370/330 |
| 2006/0222017 | A1* | 10/2006 | Quiroga | H04J 3/047 370/503 |
| 2012/0297233 | A1* | 11/2012 | Ross | H04L 12/42 713/502 |
| 2019/0385057 | A1* | 12/2019 | Litichever | G06N 3/08 |
| 2020/0389469 | A1* | 12/2020 | Litichever | H04L 12/18 |
| 2021/0350237 | A1* | 11/2021 | Litichever | H04L 63/14 |
| 2024/0430072 | A1* | 12/2024 | Boettcher | H04L 7/0079 |

* cited by examiner

COMPUTER-IMPLEMENTED METHODS FOR TRANSMITTING OR RECEIVING DATA, DEVICES FOR TRANSMITTING OR RECEIVING DATA

CROSS REFERENCE

The present application claims the benefit under 35 U.S.C. § 119 of German Patent Application No. 10 2023 205 868.5 filed on Jun. 22, 2023, which is expressly incorporated herein by reference in its entirety.

FIELD

The present invention proceeds from a computer-implemented method for transmitting or receiving data and a device for transmitting or receiving data.

BACKGROUND INFORMATION

The transmission of binary-encoded data over a transmission channel is possible with a variety of realizations for various specific applications with respective requirements for transmission security and transmission speed, data rate or overhead.

SUMMARY

Methods and devices according to features of the present invention make reliable, asynchronous, unidirectional serial transmission of binary-encoded data via only one transmission medium possible.

The advantages are that asynchronous, continuous data transmission with the least overhead and maximum data throughput is made possible by only a single synchronization bit in particular.

According to an example embodiment of the present invention, on the receiver side, only the position of the synchronization bit in the frame must be known. The number of transmitted bits per frame can then be ascertained via statistical considerations of a received bit stream.

The synchronization bit ensures that an edge change occurs at least once per frame, which makes it possible for the receiver to tune its reception time grid to the transmitter.

The accuracy requirement for the time basis for transmitter and receiver is therefore less than in other serial transmission methods.

Due to the transmitted synchronization bit, a duration of a bit can also be ascertained when a sufficiently long bit stream is received, and does not have to be known on the receiver side from the outset.

According to an example embodiment of the present invention, a computer-implemented method for receiving data provides that the data are received in a bit stream asynchronously and serially via a transmission medium, wherein the data are received in frames that comprise a respective portion of the data, wherein the frames comprise a respective synchronization bit, wherein consecutively received frames have alternating values of the synchronization bits, wherein a start of the consecutive frames is determined depending on the values of the bits of the frames, wherein the portions of the data from consecutive frames are compiled without the synchronization bit to form the data. The advantage of the method is that asynchronous, continuous data transmission with the least overhead and maximum data throughput is made possible by only a single synchronization bit.

According to an example embodiment of the present invention, it may be provided that, depending on consecutive bits in the bit stream, a first frame and a second frame and a third frame are determined, wherein a bitwise exclusive OR operation of in each case two bits assigned to one another from the first frame and from the second frame is determined, wherein a bitwise exclusive OR operation of in each case two bits assigned to one another from the second frame and the third frame is determined, and wherein a position for a start of the first frame is determined depending on a bitwise AND operation of the bitwise exclusive OR operations of in each case two bits, assigned to one another, of the bitwise exclusive OR operations.

According to an example embodiment of the present invention, it may be provided that it is checked whether the position is less than a specified number of bits of a frame, and wherein the position is re-determined if the number of bits of the frame is greater than the position.

According to an example embodiment of the present invention, it may be provided that the bits for the first frame are determined starting at the position.

According to an example embodiment of the present invention, it may be provided that the portions of the data of the frames are determined without the respective last bit of the frames.

According to an example embodiment of the present invention, it may be provided that a position of the bits in the AND operation is changed in a rolling manner, wherein a minimum of the values representing the AND operations changing in a rolling manner is found, and wherein the position for the start of a frame is determined depending on the position of the least significant bit from the minimum in the AND operation. For data that do not change in the range of the more significant bits of the frames, the position for the start is found using fewer frames, i.e., with little memory requirement.

According to an example embodiment of the present invention, it may be provided that the AND operation is determined for a number of frames for which the AND operation has only one bit with the value one, wherein the position for the start of the frame is determined depending on the position of the bit with the value one in the AND operation. For a sufficiently large number of frames, all bits of the AND operation except for one bit will have the value zero. The position for the start is determinable by counting the position of the bit with the value one.

According to an example embodiment of the present invention, a computer-implemented method for transmitting data provides that the data are transmitted in a bit stream asynchronously and serially via a transmission medium, wherein the data are transmitted in frames that comprise a respective portion of the data, wherein the frames comprise a respective synchronization bit, wherein consecutively transmitted frames have alternating values of the synchronization bits.

It may be provided that the synchronization bit is the last bit of a respective frame.

According to an example embodiment of the present invention, a device for receiving data comprises a receiver designed to receive a bit stream, wherein the device comprises a unit for compiling the data, wherein the device is designed to perform the method for receiving.

According to an example embodiment of the present invention, a device for transmitting data comprises a transmitter designed to transmit a bit stream, wherein the device comprises a unit for compiling frames, wherein the device is designed to perform the method for transmitting.

According to an example embodiment of the present invention, a computer program comprising instructions that are executable by a computer and upon the execution of which by a computer the method for transmitting and/or for receiving runs, has corresponding advantages.

Further advantageous embodiments of the present invention can be taken from the following description and the figures.

DETAILED DESCRIPTION OF EXAMPLE EMBODIMENTS

Figure 1:
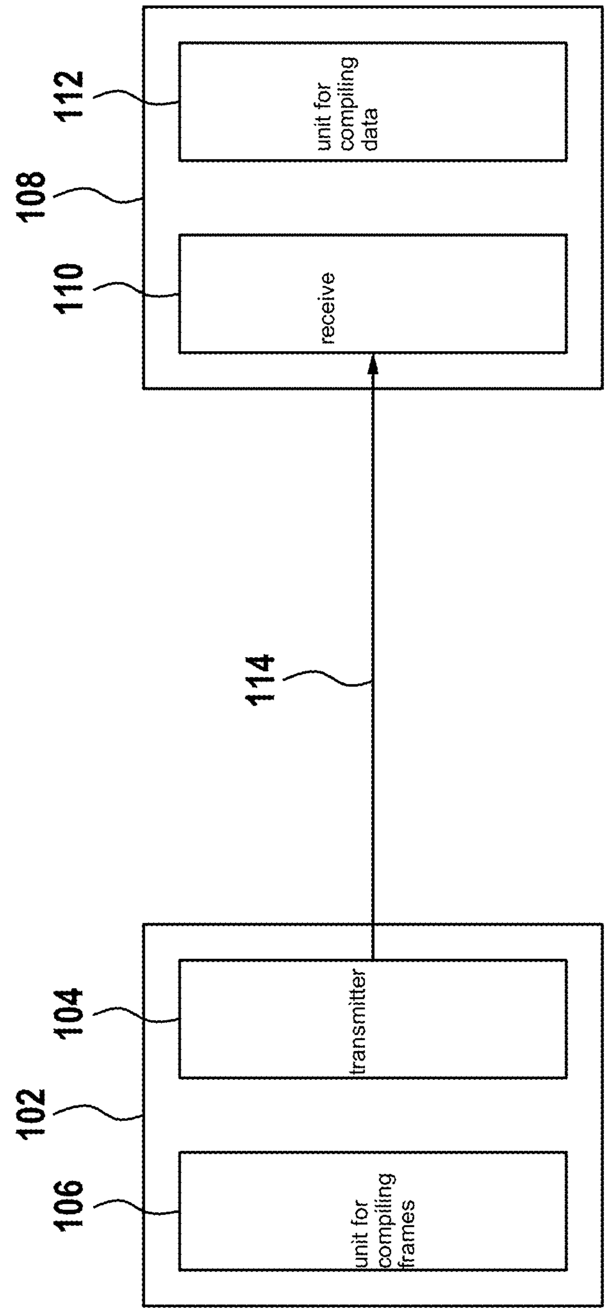
FIG. 1 shows a device for transmitting and a device for receiving data, according to an example embodiment of the present invention.

FIG. 1 schematically shows a device 102 for transmitting data.

The device 102 comprises a transmitter 104 designed to transmit a bit stream.

The device 102 comprises a unit 106 for compiling frames.

The device 102 is designed to perform a method for transmitting data.

FIG. 1 schematically shows a device 108 for receiving data.

The device 108 comprises a receiver 110 designed to receive the bit stream.

The device 108 comprises a unit 112 for compiling the data.

The device 108 is designed to perform a method for receiving data.

In the example, the transmitter 104 and the receiver 110 are connected via only one transmission medium 114. The transmission medium may be a data line or a transmission channel, e.g., for transmitting the data by means of light or by means of a radio signal.

Figure 2:
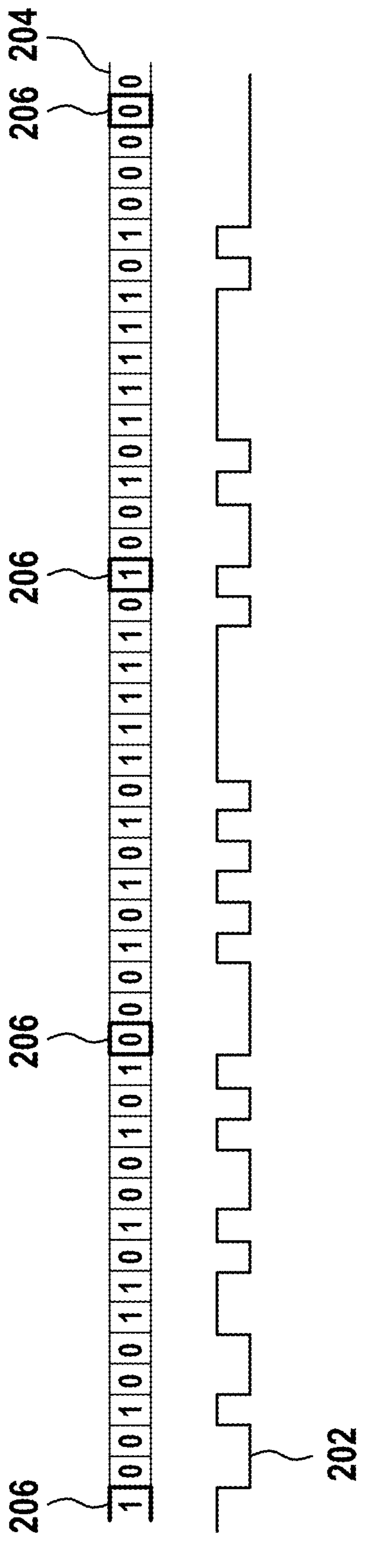
FIG. 2 shows a schematic representation of an exemplary bit stream.

FIG. 2 shows an example of the bit stream.

FIG. 2 schematically shows a time curve of an electrical signal 202 and, above it, a time curve of a corresponding logical signal 204 of the bit stream.

The bit stream comprises frames that comprise a respective portion of the data and a respective synchronization bit 206. Consecutive frames have alternating synchronization bits 206. That is to say, for example, a frame with a synchronization bit 206 with the value 1 is followed by a frame with a synchronization bit 206 with the value 0, which is followed by a frame with a synchronization bit 206 with the value 1.

A frame comprises k bits including the synchronization bit 206.

In the example, a frame comprises 14 bits for the portion of the data and, additionally, the synchronization bit 206.

The bit stream in the example is transmitted with constant bit duration in a frame. The frames in the example each comprise the most significant bit, MSB, of the portion of the data in the first position. It may also be provided that the frame comprises the least significant bit, LSB, of the portion of the data in the first position in each case. The frame may also comprise the synchronization bit 206 in the first position in the frame, followed by the other bits.

Figure 3:
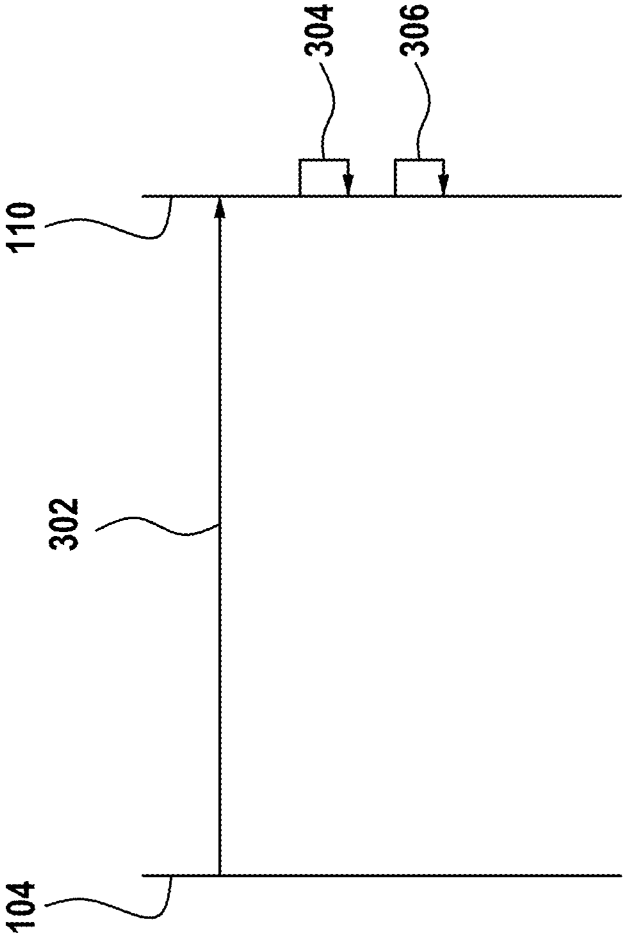
FIG. 3 shows a sequence diagram with steps of a method for transmitting and of a method for receiving the data.

FIG. 3 shows a sequence diagram with steps of a method for transmitting and of a method for receiving the data.

The data are transmitted bit by bit in the bit stream. The bit stream is transmitted bit by bit. In the example, the bit stream is transmitted at 10 k baud. Other baud rates are also possible.

On the receiver side, a time stamp is ascertained for each edge change, and the number of bits of equal and corresponding polarity is ascertained on the basis of the time difference and of the signal level of the electrical signal 202. For example, polarity means whether a bit has the value 1 or 0. Bits of equal polarity have a substantially equal electrical signal level.

In the method for receiving, from a received bit stream of length (N+1)*k, N frames comprising k bits including the synchronization bit 206 are compiled with proper synchronization. To this end, the correct start of the frames is determined in the method for receiving.

In a step 302, the data are transmitted in a bit stream asynchronously and serially from transmitter 104 to receiver 108 via a transmission medium 114.

The data are transmitted in frames that comprise a respective portion of the data.

The frames comprise a respective synchronization bit 206.

In the example, the synchronization bit 206 is the last bit of a respective frame.

Consecutively received frames have alternating values of the synchronization bits 206.

In a step 304, a start of the consecutive frames is determined depending on the values of the bits of the frames.

The frames in the example are determined iteratively.

In the example, a bit stream of length k*(N+1) is formed from the time stamps of the edge changes, and a variable MinVal is set to their maximum possible value. The maximum possible value of the variable MinVal is the maximum possible value that a bitwise AND operation of bitwise exclusive OR operations of two consecutive frames can have.

For a first iteration, a variable p for a start position is set to the value p=1 and a variable SyncPos for a synchronized start position is set to a value SyncPos=0.

In the iterations, N frames with k data bits including the synchronization bit 206 are formed starting at the position p from the bit stream in each case.

For two consecutive frames, a bitwise exclusive OR operation of the respective bits from the frames is determined:

$$X(i)=F(i) \text{ XOR } F(i+1), i=1, \ldots, N$$

where F(i) indicates the frame and i its position in the order of the N frames.

For the frames, an AND operation of the bitwise exclusive OR operations of the bits of the frames is determined:

$$A=X(1) \text{ AND } X(2), \ldots, X(N-2) \text{ AND } X(N-1)$$

If the value of A is less than the value of the variable MinVal and the value of A is odd, then MinVal=A and SyncPos=p+1 are set.

Subsequently, p=p+1 is set and it is checked whether p<k.

If p<k, the bit stream is formed in a further iteration starting at the new position p.

Otherwise, a step 306 is performed.

In step 306, the portions of the data from consecutive frames are compiled without the respective synchronization bit 206 to form the data.

For example, the portions of the data of the frames are determined without the respective last bit of the frames. This last bit is eliminated, for example, by individually shifting the bits of the frames to the right.

In the example, each portion of the data i starts with the MSB first at the position SyncPos+i*k.

A bit cycle is regenerable from the signal. In the example, the synchronization bit 206 ensures an edge change every k bits. The accuracy requirements for the bit duration on the transmitter side and receiver side only depends on the value k used. In the worst case scenario, i.e., in the event that the value 0 is transmitted in the frame, a temporal deviation of all bits may therefore be at most $|\Delta t| \leq tBit/2\ (k-1)$.

When synchronization has been found, the correctness of the synchronization position SyncPos is effected, for example, by checking the presence of the alternating polarity of the synchronization bit 206.

For example, a sensor signal, e.g., a rotation speed of an e-machine or a wheel, is transmitted. For example, the sensor signal is transmitted every 1.5 ms. On the transmitter side, only one port pin is toggled every 100 μs for this purpose. The transmission may, for example, take place from the sensor to a control unit in a vehicle.

Figure 4:
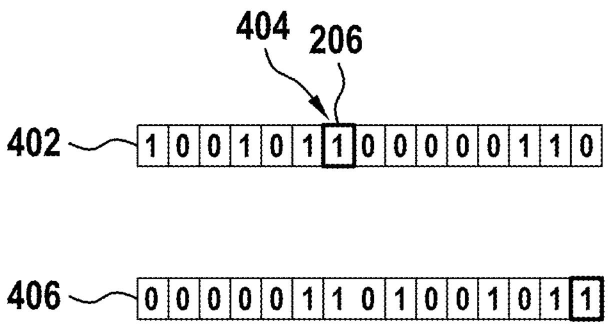
FIG. 4 shows a first exemplary operation of bits.

Assuming that the data in the more significant bits of the frames do not change, the start position is determined as follows:

A position of the bits in the AND operation is changed in a rolling manner until a minimum of the values representing the AND operations changing in a rolling manner is found. FIG. 4 shows an exemplary result 402 of the AND operation, wherein a position 404 in the AND operation that corresponds to the position of the synchronization bit 206 in the AND operation is unknown. FIG. 4 shows an exemplary minimum 406 at which the synchronization bit 206 is arranged at the position of the least significant bit, i.e., on the far right in the example.

The position for the start of a frame is determined depending on the position 404 of the least significant bit in the AND operation 402. In the example, it is the position to the right of the position 404 of the synchronization bit 206.

Figure 5:
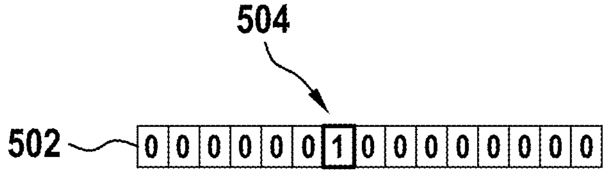
FIG. 5 shows a second exemplary operation of bits.

To the extent that a sufficiently large number of frames is available, the AND operation for the number of frames for which the AND operation has only one bit with the value one is determined. FIG. 5 shows an exemplary AND operation 502. The position for the start of a frame is determined depending on the position 504 of the bit with the value one in the AND operation. In the example, it is the position to the right of the position 504 of the bit with the value one.

What is claimed is:

1. A computer-implemented method for receiving data, the method comprising:

receiving the data in a bit stream asynchronously and serially via a transmission medium, wherein the data are received in frames that include a respective portion of the data, wherein the frames include a respective synchronization bit, wherein consecutively received frames have alternating values of the synchronization bit, wherein a start of the consecutive frames is determined depending on values of bits of the frames, wherein the portions of the data from consecutive frames are compiled without the synchronization bit to form the data.

2. The method according to claim 1, wherein, depending on consecutive bits in the bit stream, a first frame and a second frame and a third frame are determined, wherein a bitwise exclusive OR operation of in each case two bits assigned to one another from the first frame and from the second frame is determined, wherein a bitwise exclusive OR operation of in each case two bits assigned to one another from the second frame and the third frame is determined, and wherein a position for a start of the first frame is determined depending on a bitwise AND operation of the bitwise exclusive OR operations of in each case two bits, assigned to one another, of the bitwise exclusive OR operations.

3. The method according to claim 2, wherein it is checked whether the position is less than a specified number of bits of a frame, and wherein the position is re-determined when the number of bits of the frame is greater than the position.

4. The method according to claim 2, wherein bits for the first frame are determined starting at the position.

5. The method according to claim 1, wherein the portions of the data of the frames are determined without a respective last bit of the frames.

6. The method according to claim 2, wherein a position of the bits in the AND operation is changed in a rolling manner, wherein a minimum of values representing the AND operations changing in a rolling manner is found, and wherein the position for the start of a frame is determined depending on a position of a least significant bit from a minimum in the AND operation.

7. The method according to claim 2, wherein the AND operation is determined for a number of frames for which the AND operation has only one bit with a value one, wherein the position for the start of the frame is determined depending on the position of the bit with the value one in the AND operation.

8. A computer-implemented method for transmitting data, the method comprising:

transmitting the data in a bit stream asynchronously and serially via a transmission medium, wherein the data are transmitted in frames that include a respective portion of the data, wherein the frames include a respective synchronization bit, wherein consecutively transmitted frames have alternating values of the synchronization bit.

9. The method according to claim 8, wherein the synchronization bit is a last bit of a respective frame.

10. A device for receiving data, comprising:

a receiver configured to receive a bit stream; and a unit configured to compile the data, wherein the device is configured to:

receive the data in a bit stream asynchronously and serially via a transmission medium, wherein the data are received in frames that include a respective portion of the data, wherein the frames include a respective synchronization bit, wherein consecutively received frames have alternating values of the synchronization bit, wherein a start of the consecutive frames is determined depending on values of bits of the frames, wherein the portions of the data from consecutive frames are compiled without the synchronization bit to form the data.

11. A device for transmitting data, comprising:

a transmitter configured to transmit a bit stream; and a unit configured to compile frames;

wherein the device is configured to:

transmit the data in a bit stream asynchronously and serially via a transmission medium, wherein the data are transmitted in frames that include a respective portion of the data, wherein the frames include a respective synchronization bit, wherein consecutively transmitted frames have alternating values of the synchronization bit.

12. A non-transitory storage medium on which is stored a computer program for receiving data, the computer program, when executed by a computer, causing the computer to perform the following:

receiving the data in a bit stream asynchronously and serially via a transmission medium, wherein the data are received in frames that include a respective portion of the data, wherein the frames include a respective synchronization bit, wherein consecutively received frames have alternating values of the synchronization bit, wherein a start of the consecutive frames is determined depending on values of bits of the frames, wherein the portions of the data from consecutive frames are compiled without the synchronization bit to form the data.

* * * * *